(12) United States Patent
Beraja et al.

(10) Patent No.: US 8,751,264 B2
(45) Date of Patent: *Jun. 10, 2014

(54) FRAUD PREVENTION SYSTEM INCLUDING BIOMETRIC RECORDS IDENTIFICATION AND ASSOCIATED METHODS

(71) Applicant: Beraja IP, LLC, Coral Gables, FL (US)

(72) Inventors: Roberto Beraja, Coral Gables, FL (US);
Victor Beraja, Coral Gables, FL (US);
Esther Beraja, Coral Gables, FL (US);
Isidoro Beraja, Coral Gables, FL (US);
Matilde Beraja, Coral Gables, FL (US)

(73) Assignee: Beraja IP, LLC, Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,977

(22) Filed: Nov. 19, 2012

(65) Prior Publication Data

US 2014/0012756 A1 Jan. 9, 2014

Related U.S. Application Data

(60) Continuation-in-part of application No. 12/832,354, filed on Jul. 8, 2010, now Pat. No. 8,392,210, which is a continuation-in-part of application No. 12/614,841, filed on Nov. 9, 2009, and a continuation-in-part of application No. 11/928,690, filed on Oct. 30, 2007, now Pat. No. 8,260,633, which is a division of application No. 11/191,304, filed on Jul. 28, 2005, now Pat. No. 7,464,042.

(51) Int. Cl.
*G06Q 20/40* (2012.01)

(52) U.S. Cl.
CPC .................................. *G06Q 20/4014* (2013.01)
USPC ........................................................... 705/2

(58) Field of Classification Search
USPC .................................................. 705/2; 707/9
See application file for complete search history.

(56) References Cited

U.S. PATENT DOCUMENTS 5,255,183 A 10/1993 Katz
5,359,509 A 10/1994 Little et al.
(Continued)

FOREIGN PATENT DOCUMENTS

WO WO 2006-014093 A1 2/2006

OTHER PUBLICATIONS

U.S. Appl. No. 13/680,928, filed Nov. 19, 2012, Beraja et al.
(Continued)

*Primary Examiner* — John Pauls
(74) *Attorney, Agent, or Firm* — Mark R. Malek; Daniel C. Pierron; Zies Widerman & Malek

(57) ABSTRACT

A consumer identification system includes a first controller positioned at a facility and a second controller positioned at an information collection center and adapted to be in communication with the first controller. The first controller may transmit a first signal to the second controller responsive to an occurrence of an event. The second controller may initiate contact with a photograph or biometric scan database via a network interface in response to the first signal received from the first controller, and an official photograph or biometric scan associated with the consumer name may be identified. The second controller may transmit the official photograph or biometric scan to the first controller so that the official photograph or biometric scan is viewable on a user interface at the facility. A consumer identity may be verified by performing a comparison of a consumer with the official photograph or biometric scan of the consumer.

31 Claims, 11 Drawing Sheets

(56) References Cited

U.S. PATENT DOCUMENTS

| | | | |
|---|---|---|---|
| 5,583,758 A | 12/1996 | McIlroy | |
| 5,657,389 A * | 8/1997 | Houvener | 713/186 |
| 5,924,073 A | 7/1999 | Tyuluman et al. | |
| 5,924,074 A | 7/1999 | Evans | |
| 5,946,659 A | 8/1999 | Lancelot et al. | |
| 6,047,259 A | 4/2000 | Campbell et al. | |
| 6,188,988 B1 | 2/2001 | Barry et al. | |
| 6,263,330 B1 | 7/2001 | Bessette | |
| 6,283,761 B1 | 9/2001 | Joao | |
| 6,289,316 B1 | 9/2001 | Aghili et al. | |
| 6,341,265 B1 | 1/2002 | Provost et al. | |
| 6,484,144 B2 | 11/2002 | Martin et al. | |
| 6,684,276 B2 | 1/2004 | Walker et al. | |
| 6,783,459 B2 | 8/2004 | Cumbers et al. | |
| 6,827,670 B1 | 12/2004 | Stark et al. | |
| 6,836,765 B1 * | 12/2004 | Sussman | 705/75 |
| 6,988,088 B1 | 1/2006 | Miikkulainen et al. | |
| 7,213,009 B2 | 5/2007 | Pestotnik et al. | |
| 7,256,708 B2 | 8/2007 | Rosenfeld et al. | |
| 7,421,399 B2 | 9/2008 | Kimmel | |
| 7,464,042 B2 | 12/2008 | Beraja et al. | |
| 7,931,194 B2 | 4/2011 | Keys | |
| 8,150,109 B2 | 4/2012 | Sung | |
| 8,180,112 B2 | 5/2012 | Kurtz | |
| 8,260,633 B2 | 9/2012 | Beraja et al. | |
| 2001/0012913 A1 | 8/2001 | Iliff | |
| 2001/0034618 A1 | 10/2001 | Kessler | |
| 2001/0053875 A1 | 12/2001 | Iliff | |
| 2002/0019749 A1 | 2/2002 | Becker et al. | |
| 2002/0032584 A1 | 3/2002 | Doctor et al. | |
| 2002/0049612 A1 | 4/2002 | Jaeger et al. | |
| 2002/0060736 A1 | 5/2002 | Wakao et al. | |
| 2002/0087358 A1 | 7/2002 | Gilbert | |
| 2002/0116224 A1 | 8/2002 | Hengerer et al. | |
| 2002/0120471 A1 | 8/2002 | Drazen | |
| 2002/0143579 A1 | 10/2002 | Docherty et al. | |
| 2002/0143582 A1 | 10/2002 | Neuman et al. | |
| 2002/0169635 A1 | 11/2002 | Shillingburg | |
| 2003/0055679 A1 | 3/2003 | Soll et al. | |
| 2003/0120512 A1 | 6/2003 | Dengler | |
| 2003/0158467 A1 | 8/2003 | Liebert | |
| 2003/0158755 A1 | 8/2003 | Neuman | |
| 2003/0182194 A1 * | 9/2003 | Choey et al. | 705/16 |
| 2003/0212576 A1 | 11/2003 | Kim | |
| 2003/0233250 A1 | 12/2003 | Joffe et al. | |
| 2004/0015337 A1 | 1/2004 | Thomas et al. | |
| 2004/0078220 A1 | 4/2004 | Jackson | |
| 2004/0122701 A1 | 6/2004 | Dahlin et al. | |
| 2004/0143454 A1 | 7/2004 | Kimmel | |
| 2004/0153338 A1 | 8/2004 | Kim et al. | |
| 2004/0260577 A1 | 12/2004 | Dahlin et al. | |
| 2004/0267572 A1 | 12/2004 | Emery et al. | |
| 2005/0015352 A1 | 1/2005 | Verlinden et al. | |
| 2005/0219360 A1 * | 10/2005 | Cusack et al. | 348/156 |
| 2005/0240444 A1 | 10/2005 | Wooten et al. | |
| 2006/0237531 A1 | 10/2006 | Heffez et al. | |
| 2007/0138260 A1 * | 6/2007 | Keys | 235/380 |
| 2007/0167687 A1 | 7/2007 | Bertolero et al. | |
| 2007/0299776 A1 | 12/2007 | Frustaci et al. | |
| 2008/0097851 A1 * | 4/2008 | Bemmel et al. | 705/14 |
| 2008/0097910 A1 | 4/2008 | Dicks et al. | |
| 2008/0168062 A1 * | 7/2008 | Reeves | 707/9 |
| 2009/0185723 A1 * | 7/2009 | Kurtz et al. | 382/118 |
| 2009/0204434 A1 | 8/2009 | Breazeale | |
| 2010/0274582 A1 | 10/2010 | Beraja et al. | |
| 2010/0274583 A1 | 10/2010 | Beraja et al. | |
| 2010/0280843 A1 | 11/2010 | Beraja et al. | |
| 2010/0332252 A1 | 12/2010 | Beraja et al. | |
| 2011/0112848 A1 | 5/2011 | Beraja et al. | |
| 2011/0112850 A1 | 5/2011 | Beraja et al. | |

OTHER PUBLICATIONS

Medical Expert Systems, May 20, 2005, http://www.computer.privateweb.at/judith/name.sub.--3.htm.

* cited by examiner

FRAUD PREVENTION SYSTEM INCLUDING BIOMETRIC RECORDS IDENTIFICATION AND ASSOCIATED METHODS

RELATED APPLICATIONS

This application is a continuation in part of U.S. patent application Ser. No. 12/832,354 titled Medical Claims Fraud Prevention System and Associated Methods filed on Jul. 8, 2010, which is in turn a continuation in part of U.S. patent application Ser. No. 12/614,841 titled Medical Decision System Including Question Mapping and Cross Referencing System and Associated Methods filed on Nov. 9, 2009 and U.S. patent application Ser. No. 11/928,690 titled Medical Decision Auditing Method and System filed on Oct. 30, 2007, which is a division of U.S. Pat. No. 7,464,042 titled Medical Professional Monitoring System and Associated Methods, the entire contents of which are incorporated herein by reference.

FIELD OF THE INVENTION

The present invention relates to the systems in the field of preventing fraud and related methods.

BACKGROUND OF THE INVENTION

Current systems that are used to monitor financial transactions, such as those for reimbursement of medical care claims to health insurance companies, that are provided to consumers are outdated and can be costly. For example, some companies transmit a notice to a consumer after a good or service has been provided. The notice indicates that the good or service that has been provided. This type of system carries out fraud prevention by putting the consumer on notice of the type of good or service that a facility operator may be seeking payment for. If the good was not provided or the service did not occur, then a consumer receiving the notification will likely contact the company to clear up the discrepancy.

Several systems exist to conduct reviews of healthcare. For example, U.S. Pat. No. 5,359,505 to Little et al. discloses a healthcare payment and review system. The system reviews and adjudicates healthcare payment requests made by a healthcare provider for procedures performed. The system reviews the payment request based on user-specified review criteria. Such criteria may reflect contractual arrangements between payers; providers and patients; current, locally acceptable medical practices; and patient and provider payment request patterns. To perform the review, the expert system obtains relevant prior payment requests and defines a master list of payable payment requests given current medical procedures. The system goes on to analyze the current payment request according to the relevant historical payment requests and the master payable list by applying user-defined interpretive rules to this information. Payment decisions are developed and reported based on the analysis.

Many times, medical services can only be provided to a patient when the patient is located the same location as the medical professional. There exist systems that track the location of patients. For example, U.S. Published Patent Application No. 2009/0204434 by Breazeale Jr. discloses a healthcare tracking system that obtains location-time data automatically generated by a mobile electronic device associated with a healthcare provider, and that correlates the location-time data with a location of the healthcare patient. This system, however, is directed to assuring that patients are billed for procedures that have been performed. The location information of the patient is used to reflect a triggering event for billing purposes.

U.S. Published Patent Application No. 2007/0299776 by Frustaci et al. discloses a method for preventing medical fraud that uses a real time transmitted identification system to verify patient identification, location, time and medical service provider identification. The system verifies provision of services to an authorized service user by assigning a unique identifying number to each authorized service provider and by assigning a unique identifying number to each authorized service user. The system determines the likelihood that an insurance claim by a service provider is valid by defining the unique identifying feature of each of the authorized patients and for each of the authorized doctors. Accordingly, the system is directed to determining probabilities of whether or not a medical claim may be fraudulent. The Frustaci et al. '776 patent application discloses that the patient's physical location may be determined by an attached GPS system at the provided location. The system obtains the patient's and the provider's fingerprints, or other identifying feature, and transmits the identifying feature information to a service confirmation center in real time.

U.S. Pat. No. 7,421,399 to Kimmel discloses a method of discouraging healthcare fraud in conjunction with providing healthcare services to patients in which the patient provides a biometric signature. More specifically, the system uses biometric information unique to an individual combined with location information to create a persistent record indicating that a particular person was physically present at a particular place.

SUMMARY OF THE INVENTION

With the above in mind, the present invention advantageously provides a fraud prevention system that readily confirms that a consumer was present at the time that a transaction is being made. The present invention further advantageously provides many different ways to verify the identity of a consumer so as to provide redundancies and backups to ensure that an appropriate transaction is not rejected.

These and other objects, features, and advantages according to the present invention are provided by a fraud prevention system comprising a first controller positioned at a facility and a second controller positioned at an information collection center. The second controller is adapted to be in communication with the first controller. The fraud prevention system also comprises a network interface and a photograph database accessible via the network interface. The photograph database may include photographs that are verifiable, or official photographs. Alternatively, the fraud prevention system may comprise a network interface and a biometric scan database accessible via the network interface. The biometric scan database may include biometric scans of biometric features that are verifiable, or official biometric scans.

The first controller of the fraud prevention system may send a first signal to the second controller responsive to an occurrence of an event. The second controller may initiate contact with either the photograph database or the biometric scan database, or both, via the network interface in response to the first signal received from the first controller. The first controller may also transmit a request for an official photograph or biometric scan associated with a consumer name to the second controller. The official photograph or biometric scan associated with the consumer name may be identified within the photograph database or the biometric scan database, respectively.

The second controller may transmit the official photograph or biometric scan associated with the consumer to the first controller in response to the first signal received from the first controller. The transmitted official photograph or biometric scan may be viewable on a user interface at the medical facility. A consumer identity may be verified by performing a comparison of a consumer with the official photograph or biometric scan associated with the consumer.

The consumer may be assigned a consumer information unit having consumer information associated therewith. The event may be reading information from the consumer information unit. The first controller may be a consumer information unit reader adapted to read the consumer information associated with the consumer information unit. Alternatively, the first controller may be a biometric sensor, and the event may be scanning a biometric feature of the consumer.

A software system in communication with the first controller may be used by a facility associate at the facility. While using the software system, the facility associate may be prompted to enter information relating to the consumer. In such a case, the event may be entry of the information relating to the consumer using the software system. Alternately, a billing system may be used at the facility to bill for services provided or goods rendered to the consumer. In such a case, the event may be use of the billing system with respect to the consumer. Accordingly, the system of the present invention advantageously provides several different options to prompt verifying the consumer's identity.

The information collection center may be associated with processing financial transactions. The signal transmitted from the first controller to the second controller may include information relating to a financial transaction related to goods or services being provided to the consumer at the facility. The second controller may transmit a signal to the first controller including an indication of whether or not the transaction is a valid transaction based on the indication of whether the consumer identity is verified. Accordingly, the present invention advantageously decreases the time required to provide approval for a proposed financial transaction. Further, a facial recognition program may perform the comparison of the consumer and the official photograph of the consumer, further decreasing time required for approval and greatly reducing chances of fraud.

The official photograph may be a DMV record photograph. A copy of the official photograph may be stored on a memory that may be associated with the first controller to define a stored official photograph. The stored official photograph may be verified by comparing the stored official photograph to the official photograph after a time period.

The official biometric scan may be an iris scan, retinal scan, finger print, or a thumb print associated with the DMV, a licensing agency, a passport agency, or a law enforcement agency. A copy of the official biometric scan may be stored on a memory that may be associated with the first controller to define a stored official biometric scan.

The system may also include a backup locating system that is activated to perform an action based on a backup event. The backup event that activates the backup location system may be an indication received from the first controller that the consumer identity is not verified based on the comparison of the consumer to the official photograph of the patient or of a biometric feature of the consumer to the official biometric scan. The action may be calling a mobile telephone associated with the consumer and speaking with the consumer to verify the consumer identity. The predetermined action may also be providing a notification to the facility including a request that the consumer contact the patient information collection center to verify the consumer identity. Alternately, the predetermined action may be calling the facility, speaking with the consumer, and requiring the consumer to verify the consumer identity using a predetermined consumer identifier.

A method aspect of the present invention is for preventing fraud. The method may include transmitting a first signal from a first controller positioned at the facility to a second controller positioned at the patient information collection center responsive to an occurrence of an event. The method may also include initiating contact with a photograph database or a biometric scan database using a network interface in response to the first signal. The first signal may also include a request for an official photograph or biometric scan associated with a consumer name. The method may further include identifying the official photograph or biometric scan associated with the consumer name within the photograph database or biometric scan database. The method may also include transmitting the official photograph or biometric scan associated with the consumer name from the second controller to the first controller so that the official photograph or biometric scan is accessible and viewable on a user interface at the facility. The method may also include verifying the consumer identity by performing a comparison of the consumer with the official photograph or biometric scan associated with the consumer. The method may also include activating a backup verification system to perform an action based on a backup event. The backup event may be an indication from the first controller that the consumer identity is not verified based on the comparison of the consumer to the official photograph or biometric scan associated with the consumer.

DETAILED DESCRIPTION OF THE PREFERRED EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Reference is made specifically to FIGS. 1-29 and the written description thereof of U.S. patent application Ser. No. 12/832,500 titled Medical Claims Fraud Prevention System Including Historical Patient Locating Feature and Associated Methods filed on Jul. 8, 2012, the entirety of which is hereby incorporated by reference.

The system according to the present invention is a computerized system that requires the performance of one or more steps to be performed on or in association with a computerized device, such as, but not limited to, a server, a computer (i.e., desktop computer, laptop computer, netbook or a machine having a processor), a dumb terminal that provides an interface with a computer or server, a personal digital assistant, mobile communications device, such as an iPhone, Blackberry or other similar device which provides computer or quasi-computer functionality, a mobile reader, such as a Kindle, which provides reader functionality that may be enabled through either internal components or connecting to an external computer, server or global communications network (such as the Internet) to take direction from or engage in processes which are then delivered to the mobile reader. It should be readily apparent to those of skill in the art that other types of devices, individually or in conjunction with an overarching architecture associated with an internal or external system, may be utilized to provide the "computerized" environment necessary for the at least one process step to be carried out in a machine/system/digital environment. It should be noted that the method aspects of the present invention are preferably computer implemented methods and, more particularly, at least one step is preferably carried out using a computerized device. In short, a computerized system according to the present invention is meant to include any device having a processor and a memory.

Figure 1A:
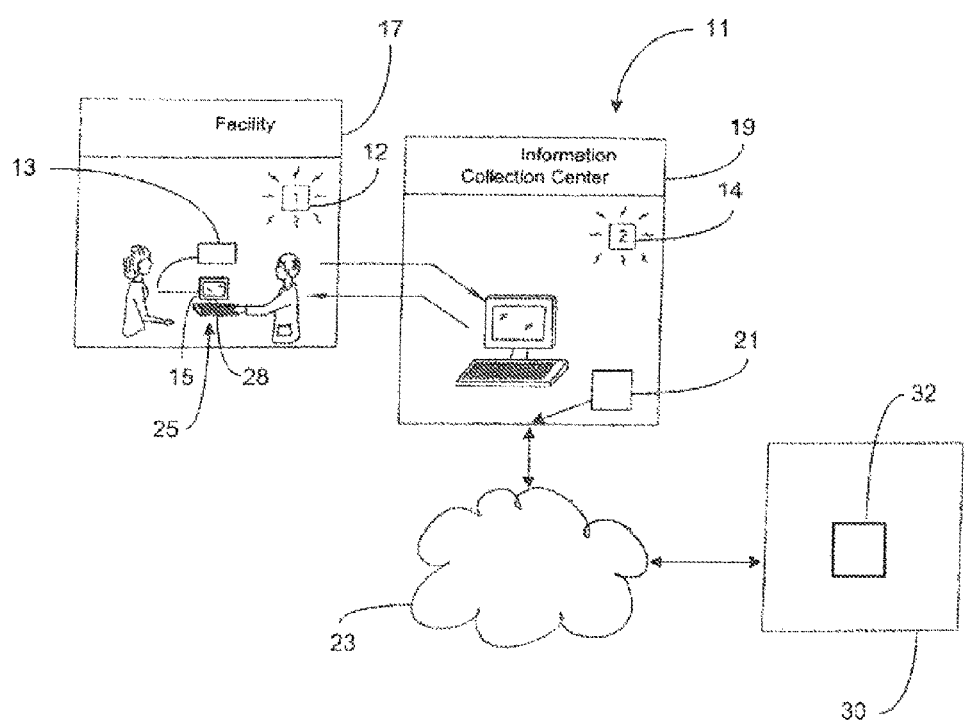
FIG. 1A is a schematic environmental view of a fraud prevention system according to the present invention.

Referring now to FIG. 1A, a fraud prevention system 11 according to the present invention is now described in greater detail. The fraud prevention system 11 illustrated in FIG. 1A, according to an embodiment of the present invention, advantageously decreases fraud by verifying a consumer identity at a facility where medical services are being provided at the time that the medical services are being provided. This verification may be performed by comparing an official photograph 30 of a consumer to the consumer. Alternatively, verification may be performed by comparing an official biometric scan of a consumer to a biometric scan obtained at the facility 17 of the consumer.

The system 11 may include a first controller 12 positioned at a facility 17. As discussed in greater detail above and below, the first controller 12 may be provided in several different ways to achieve the objects, goals, features and advantages of the present invention. The first controller 12 may include a user interface 28 to receive indications relating to the consumer. For example, it may be desirous to provide an indication that the consumer identity may be verified using a visual indication, an audible indication, or any other type of indication suitable for informing a user of the findings and determinations of the system 11. The indication may, for example, be an electronic mail, a pop-up message, or any number of indications suitable for informing the user of the determinations made by the system 1 with respect to the verification of the consumer identity.

The system 11 may also include a second controller 14 positioned at an information collection center 19. The second controller 14 may be adapted to be in communication with the first controller 12. More specifically, the first and second controllers 12, 14 may be in communication with one another in any of a number of ways. After having had the benefit of reading this disclosure, those skilled in the art will appreciate that the first and second controllers 12, 14 may be positioned in communication with one another via a wireless connection, a modem, a radio link, a LAN, or any other type of connection suitable for allowing the first and second controllers 12, 14 to communicate with one another and to transmit data, in any form, and other information between one another. More particularly, the system 10 according to an embodiment of the present invention contemplates that data in the form of text, pictures, video, sound, or any other form may be transmitted between the first and second controllers 12, 14 to carry out the objects, features and advantages according to the present invention.

The second controller 14 may include a network interface 21, which may facilitate communication with an official database 30 via a network 23. The official database 30 may include photographs or biometric scans that are verifiable, and which may be defined as official photographs or biometric scans 32. A skilled artisan will readily recognize that official photographs 32 may be from any number of official records, including, but not limited to, DMV records, arrest records, student records, or patient records from any medical facility, and that official biometric scans may be scans of biometric features that may be scanned including, without limitation, irides, retinae, finger prints, and thumb prints.

In an alternative embodiment, the second controller 14 may include an official database 30 that the second controller 14 may communicate with without the use of a network interface. The official database 30 may include photographs or biometric scans that are verifiable, and which may be defined as official photographs or biometric scans 32.

The first controller 12 may send a first signal to the second controller 14 responsive to an occurrence of an event. In turn, the second controller 14 may transmit a photograph or biometric scan to the first controller 12 in response to the first signal received from the first controller 12 that is associated with the identified consumer. Accordingly, the system 11 according to the present invention advantageously provides a photograph or biometric scan of the consumer whose consumer information is being asserted at the facility 17 upon the occurrence of the event so that it may be determined whether or not the individual asserting the consumer information is, or at least has the appearance or biometric features of, the consumer. The present invention makes the assumption that if the individual asserting the consumer information has an appearance or biometric feature sufficiently similar to the photograph or biometric scan retrieved by the second controller 14, then that individual is in fact the consumer associated with the consumer information In one embodiment of the system 11 according to the present invention, the consumer may be assigned a consumer information unit 13 having consumer information associated therewith. The consumer information unit 13 may, for example, be a consumer credit, debit, or charge card, hereinafter referred to as a consumer card, bar code, QR code, RFID device, near-field communication device, or a scannable image.

The consumer card may include a transmitting device embedded therein. For example, the consumer card may include a radio frequency transmitter embedded within a body portion thereof. The event that may trigger the action of retrieving the photograph or biometric scan associated with the consumer may, for example, be reading information from the consumer information unit 13. For example, when a patient presents the patient insurance card to a facility associate upon entering the facility 17 to purchase goods or services, the facility associate may read information from the consumer card using a device adapted to read consumer information from the consumer card. Upon the occurrence of such event, the first controller 12 may send a first signal to the second controller 14 to prompt the retrieval of a photograph or biometric scan associated with the consumer information.

Accordingly, the first controller 12 may be provided by a consumer information unit reader 15 that may be adapted to read the consumer information associated with the consumer information unit 13. By way of example, the consumer information unit 13 may include a magnetic stripe having consumer information stored thereon. Further, the consumer information unit reader 15 may include a magnetic stripe reader adapted to read consumer information from the magnetic stripe on the consumer information unit 13. Upon reading the consumer information from the magnetic stripe, the consumer information may be loaded onto a software system 25 used at the facility 17. Upon reading the consumer information from the magnetic stripe of the consumer information unit 13, the first controller 12 may send the first signal to the second controller 14 to prompt the retrieval of a photograph or biometric scan associated with the consumer information. Those skilled in the art will appreciate, after having had the benefit of reading this disclosure, that the first controller 12 may be integrally formed into the magnetic stripe reader, or may be a standalone device adapted to be in communication with the magnetic stripe reader.

By way of an additional example, the consumer information unit 13 may be a consumer card that includes a radio frequency transmitter embedded therein. The consumer information unit reader 15 may include a radio frequency receiver adapted to receive a radio frequency signal transmitted from the consumer card. The radio frequency signal transmitted from the consumer card may, for example, include consumer information relating to the consumer, e.g., insurance information, addresses or telephone numbers, social security numbers, or personal identification numbers. Upon receiving the radio frequency signal from the consumer information unit 13, the first controller 12 may send the first signal to the second controller 14 to prompt the retrieval of a photograph or biometric scan associated with the consumer information.

The consumer information unit 13 may, for example, also be a card adapted to charge a checking, saving, or credit account of the consumer. Checking and savings accounts are accounts held by banking institutions or credit unions that permit ready access to those funds by the account holder. Credit accounts give the account holder access to a quantity of funds up to a limit that the consumer may borrow from a credit agency, whereupon the account holder incurs a debt to the credit agency for which the account holder is liable to repay. A card, such as a debit or credit card, for example, may be used to access these funds. Such funds may be accessed, for example, at the time that a payment is due from the consumer. Accordingly, charging the debit or credit card for the payment may be considered the event that prompts the first signal to be transmitted from the first controller 12 to the second controller 14 to prompt the retrieval of a photograph or biometric scan associated with the consumer information.

By way of an additional example, the consumer information unit 13 may be a patient insurance card that includes a magnetic stripe having patient information stored thereon. Further, the consumer information unit reader 15 may include a magnetic stripe reader adapted to read patient information from the magnetic stripe on the consumer information unit 13. Upon reading the patient information from the magnetic stripe, the patient information may be loaded onto a software system used at the facility 17. Those skilled in the art will appreciate, after having had the benefit of reading this disclosure, that the first controller 12 may be integrally formed into the magnetic strip reader, or may be a standalone device adapted to be in communication with the magnetic card reader.

By way of an additional example, the consumer information unit 13 may be a patient insurance card that includes a radio frequency transmitter embedded therein. The consumer information unit reader 15 may include a radio frequency receiver adapted to receive a radio frequency signal transmitted from the patient insurance card. The radio frequency signal transmitted from the patient insurance card may, for example, include patient information relating to the patient, e.g., insurance information. Upon receiving the radio frequency signal from the consumer information unit 13, the first controller 12 may send the first signal to the second controller 14 to prompt the retrieval of a photograph or biometric scan associated with the consumer information.

The consumer information unit 13 may, for example, also be a card adapted to charge a health savings account or a flex spending account of a consumer patient. Health savings accounts and flex spending accounts are generally provided by insurance companies to their customers or employers to their employees so that the customer may put money aside in a savings account. The funds that are put aside in the savings account are generally put aside prior to income tax being taken out, i.e., pre-tax. This advantageously encourages insurance customers to save a certain amount of money in order to pay for medical expenses that may arise, i.e., co-pays, deductibles, etc. A card, such as a debit card, for example, may be used to access these funds. Such funds may be accessed, for example, at the time that a co-pay is due from the consumer patient. Co-pays are generally payable upon arrival at a medical facility prior to being seen by a medical professional. Accordingly, charging the debit card for the co-pay may be considered the event that prompts the first signal to be transmitted from the first controller 12 to the second controller 14 to prompt the retrieval of a photograph or biometric scan associated with the consumer information.

Those skilled in the art will appreciate, after having had the benefit of reading this disclosure, that the system 10 according to the present invention may advantageously use biometric sensors and biometric scans of biometric features produced by biometric sensors to satisfy a number of features. For example, a biometric sensor may be positioned at the facility 17 to read a biometric feature of a consumer, i.e., a thumb print, a finger print, an iris scan, a retina scan etc., of a consumer and capture an image of the biometric feature. This can advantageously be used to provide the first controller 12 with the consumer information necessary to initiate retrieval of the official photograph. More specifically, and by way of example only, the photograph database 30 may associate each official photograph 32 with a finger print or set of finger prints taken from an individual. When the biometric sensor scans a thumb or finger print, the first controller 12 may receive the reading from the biometric sensor and transmit that scan to the second controller 14. The second controller 14 may then transmit the scan to the photograph database 30, which may in turn determine which official photograph 32 is associated with a thumb or finger print that matches the scan.

Alternatively, the biometric sensor may provide a biometric scan that serves as an independent verification of the identity of the consumer. More specifically, in addition to comparison with the official photograph 32, the biometric scan created by the biometric sensor may be compared with an official biometric scan associated with the consumer whose identity is being asserted at the facility 17 stored at a biometric scan database.

According to an alternate embodiment of the present invention, the biometric scan may function similarly to a consumer information unit described hereinabove, in that the biometric sensor may scan a biometric feature, such as a finger or thumb print of a consumer, and associate the scan with the consumer on a memory associated with the first controller 12, described in greater detail hereinbelow. In this scenario, the identity of the consumer may need to be validated by alternative means, such as by a state issued identification card or document, e.g. a driver's license. At each subsequent visit, the consumer may assert their identity by scanning a finger or thumb print at the biometric sensor, which may act as the predetermined event for the first controller 12.

Many biometric sensors are associated with recognition biometric systems that positively verify a match between two scans of biometric features on the basis of pattern recognition. That is, each consumer has a unique pattern associated with a biometric feature that is singular and individual to the consumer. When the pattern of a scanned biometric feature matches the pattern of a previously scanned biometric feature, that indicates the scans came from the same individual. The determination of the pattern of the biometric feature employs the use of a computerized device and an algorithm. In the present invention, where a biometric sensor is employed, the pattern determination may be performed by the system 10, by a database containing official biometric scans, or other biometrically related information, associated with the biometric feature scanned by the biometric sensor, or by a third computerized device apart from, but in communication with at least one of the system 10 and the database containing official biometric scans. In such systems, once a pattern has been determined for a biometric feature scanned by the biometric sensor at the system 10, that pattern may be utilized to verify the identity of the consumer at the facility 17, retrieve an official photograph 32 from the photograph database 30, or function as the predetermined event for the system 10.

The user interface 28 may include a display. The user interface 28 may receive from the first controller 12 the photograph or biometric scan retrieved by the second controller 14 and recreate an image of the photograph or biometric scan on the display. When the photograph or biometric scan is recreated on the display, a facility associate may make an individual determination, based upon the perceived likeness between the individual asserting the consumer information at the facility and the individual depicted in the photograph, or based upon the perceived similarity between a biometric scan if the individual at the facility and the biometric scan received from the second controller 14 whether those persons are one and the same.

The first controller 12 may have associated with it a memory. The memory may be configured to store the photograph or biometric scan retrieved by the second controller 14. Moreover, once a photograph or biometric scan has been received by the first controller 12 in response to the request generated by the first controller 12 upon the reading of a consumer information unit 13, the first controller 12 may associate the retrieved photograph or biometric scan with the consumer information provided by the consumer information unit 13 and store the photograph or biometric scan in the memory, thereby defining a stored official photograph or a stored official biometric scan. The storage of the photograph or biometric scan may be short-term or long-term.

When the stored official photograph or biometric scan is associated with customer information, the first controller 12 may retrieve the photograph or biometric scan at any time. For instance, an individual may provide a consumer information unit 13 to be read by the consumer information unit reader 15 as described above. When the first controller 12 reads the consumer information from the consumer information unit 13, it may retrieve the photograph or biometric scan that is stored in the memory.

When the first controller 12 retrieves the stored official photograph or biometric scan, it may determine whether or not the photograph or biometric scan may still be appropriately used for identification purposes. For example, if a period of time has elapsed since the retrieval of the photograph or biometric scan that is greater than an allowable time period, the image or scan may be considered no longer appropriate for identification use. As another example, a facility associate may determine that there are sufficient differences between the individual present at the facility 17 and the stored official photograph or biometric scan such that the stored official photograph or biometric scan may have at one time, but no longer is appropriate for identification purposes.

In these and other circumstances wherein it is determined the stored photograph is no longer suitable for identification uses, the first controller 12 may request an updated official photograph 32 or official biometric scan from the second controller 14. The second controller 14 may in turn request an official photograph 32 from the photograph database 30, or official biometric scan from the biometric scan database, using substantially the same methods as described above. Alternatively, the first controller 12 may be configured to request an updated official photograph 32 or biometric scan each time consumer information is asserted by an individual in the facility 17.

Additionally, the stored official photograph or biometric scan associated with the customer information may be updated whenever the official photograph 32 stored in the photograph database 30, or the official biometric scan stored in the biometric scan database, is updated. The first controller 12 may be configured to periodically request the second controller 14 to access the photograph database 30 or the biometric scan database to determine whether an updated official photograph 32 or biometric scan for the consumer associated with the consumer information is available. If an updated official photograph 32 or biometric scan is available, the second controller 14 may retrieve the updated official photograph 32 or biometric scan and send it to the first controller 12. When the first controller 12 receives the updated official photograph 32 or biometric scan, it may then designate the updated official photograph 32 or biometric scan as the stored official photograph or biometric scan. The first controller 12 may optionally retain or delete the previous stored official photograph or biometric scan. It may be desirous to retain all stored official photographs and biometric scans to ensure there is a discernible continuity between the official photographs 32 retrieved from the photograph database 30 or the official biometric scans retrieved from the biometric scan database.

According to another embodiment of the present invention, the system 11 may further include an image capture device. The image capture device may be in electronic configuration with the first controller 12 and may be capable of capturing an image of a field of view. Furthermore, the image capture device may be positioned to capturing an image of the individual asserting the consumer information at the facility 17. The captured image of the individual may then be compared to the official photograph 32 of the consumer associated with the consumer information. Moreover, the photograph may either be a photograph that has been retrieved from the photograph database 30 at the time of the individual's visit to the facility 17, or it may be a photograph that has been previously retrieved by the first controller 12 and stored in the memory of the first controller 12.

The first controller 12 may further be configured to perform an analysis of the captured image and either of the official photograph 32 or the stored official photograph, or both. The first controller 12 may determine whether there are sufficient similarities or differences between the captured image and the official photograph 32 or the stored official photograph so as to determine whether the individual asserting the consumer information is the consumer associated with the consumer information. If the first controller 12 determines the individual is likely one and the same as the consumer, first controller 12 may indicate to the facility associate that a positive visual identification was made. If the first controller 12 determines the individual is not likely one and the same as the consumer, the first controller may take one of many additional steps. For example, the first controller 12 may request an updated official photograph 32 from the second controller 14. If the second controller 14 determines an updated official photograph 32 is available from the photograph database, it may retrieve the official photograph 32 and transmit the photograph to the first controller 12. If the second controller 14 determines there is no updated official photograph, it may transmit a signal to the first controller 12 indicating such. In such a scenario, the first controller 12 may indicate to the facility associate that a positive visual identification could not be made.

The determination of whether the individuals depicted in the captured image and the official photograph 32 or the stored official photograph may be made by the first controller 12, which may include software capable of identifying similarities between photographs of individuals. For example, the software may be facial recognition software that identifies points of reference from which to verify the positive or negative identification of the individuals depicted in the two photographs.

Additionally, the first controller 12 may include an algorithm to determine the similarity between the individual depicted in the captured image and the individuals depicted in the official photograph 32 or the stored official photograph. The algorithm may identify markers known in the art that permit individuals to be differentiated so as to determine if the individuals depicted in two photographs are one and the same. Moreover, the algorithm may be configured to account for certain physiological changes that an individual may have experienced in the time period between the capturing of the official photograph 32 and the captured image, such as, for example, aging, changes in skin tone, changes in hair color, weight change, and other changes. This list is exemplary only and does not limit the scope of the invention to those physiological changes listed.

Similarly, the second controller 14 may include software, an algorithm, or both, capable of identifying similarities between the individuals depicted in the captured image and the official photograph. The software included with the second controller 14 may be facial recognition software. The software included with the second controller may be in place of or addition to the software included with the first controller 12. Where software capable of identifying similarities between the stored official photograph and the official photograph 32 is included in both the first controller 12 and the second controller 14, the results of each of the software may be compared for consistency, displayed on the user interface, or both.

Figure 1B:
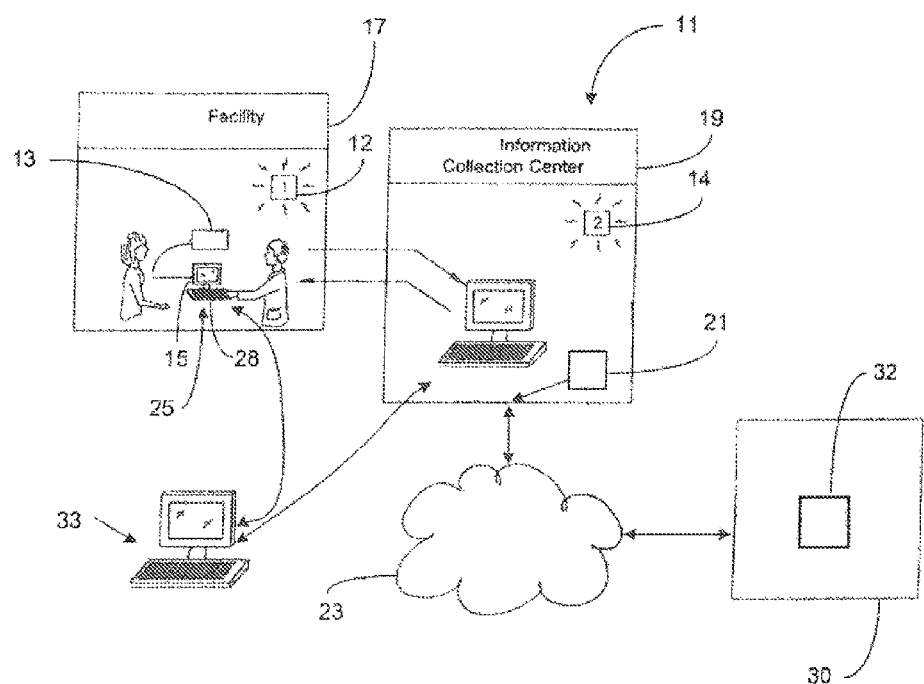
FIG. 1B is a schematic environmental view of a fraud prevention system according to the present invention.

In another embodiment, as depicted in FIG. 1B, a remote computerized device 33 in communication with at least one of the first controller 12 and the second controller 14 may include software, an algorithm, or both, capable of identifying similarities between the individuals depicted in the captured image and the official photograph or biometric scan 32. The results of the comparison may be transmitted from the remote computerized device 33 to either of the first controller 12 and the second controller 14, or both.

The software included with the remote computerized device 33 may be facial recognition software. Where software capable of identifying similarities between the stored official photograph and the official photograph 32 is included in the remote computerized device 33 and at least one of the first controller 12 and the second controller 14, the results of each of the software analyses may be compared for consistency, displayed on the user interface 28, or both.

Returning to FIG. 1A, when the first controller 12 has completed its analysis of the captured image and the official photograph 32, it may produce a result indicating the similarity between the individual depicted in the captured image and the individual depicted in the official photograph 32. Moreover, the results of the analysis may be displayed on a display of the first controller 12 as described hereinabove. Additionally, each of the captured image and the official photograph may also be displayed on the display of the first controller 12. The indication of similarity may be above a threshold value, indicating a likeliness that the individuals depicted in the captured image and the official photograph are one and the same. The threshold value may be any value indicating a degree of similarity at which the identity may be considered verified. The threshold value may be pre-set by the facial recognition program, or it may be adjusted to provide greater or lesser confidence in the verification of the identity. If the indication of similarity is equal to or above the threshold value, the transaction may be determined to be valid, and may be permitted to proceed.

Furthermore, where the indication of similarity is below the threshold value, the transaction may be determined to be invalid. The first controller 12 may present an additional warning on the display indicating that it is unlikely the individual depicted in the captured image is the same as the individual depicted in the official photograph 32. The first controller 12 may be optionally configured to permit this additional warning to be dismissed and the transaction to proceed. Furthermore, the first controller 12 may be configured to require entry of an explanation, justification, password, code, or other input for the transaction to proceed. Alternatively, the first controller 12 may not allow the transaction to proceed under any circumstance.

As yet another alternative, the first controller 12 may permit a second image to be captured, and the analysis performed again. Where a second analysis is performed, if the second analysis yields an indication of similarity greater than or equal to the threshold value, the transaction may be permitted to proceed. Where the second analysis yields a second indication of similarity less than the threshold value, the first controller 12 may optionally prevent the transaction from proceeding or require an explanation, justification, password, code, or other input for the transaction to proceed.

In an alternative embodiment, the first controller 12 may be a computerized device positioned in the home of an individual. The first controller 12 may operate substantially as above, wherein the image capture device may be a camera in electronic communication with the computerized device, such as a webcam. The webcam may capture an image of an individual asserting consumer information via the computerized device in the course of a transaction. The computerized device may request an official photograph 32 from a second controller 14 substantially as described hereinabove. Once retrieved, the computerized device may compare the image captured by the webcam with the official photograph 32 as described hereinabove, and determine if a positive visual identification can be made.

The system 11 according to an embodiment of the present invention contemplates that a software system 25 may be positioned in communication with the first controller 12. The facility 17 associate may be prompted to enter information relating to the consumer using the software system 25. Accordingly, the predetermined event that prompts the retrieval of a photographer associated with the consumer information may be entry of information relating to the consumer using the software system 25. Additionally, the software system 25 may be a medical software system.

This configuration of the system 11 according to the present invention is advantageous when a facility 17 is not equipped with a consumer information unit reader 13 that may read information from a consumer information unit 13. In this configuration, the facility associate may manually enter information relating to the consumer into the software system 25. Upon entering information relating to the consumer into the software system 25, the first controller 12 may send the first signal to the second controller 14 to prompt retrieval of a photograph associated with the consumer information. After having had the benefit of reading this disclosure, those having skill in the art will appreciate that any use of a software system 25 may be the event that prompts retrieval of a photograph associated with the consumer information.

Another event that may prompt retrieval of a photograph associated with the consumer information may be use of a billing system at the facility 17 for goods or services provided to the consumer. Accordingly, upon entering information, or any use of the billing system at the facility 17 with respect to the consumer, the first controller 12 may send the first signal to the second controller 14 to retrieve a photograph associated with the consumer information.

The system 11 according to the present invention contemplates that the facility 17 may be a retail store, service store, and online retailer. Furthermore, the system 11 according to the present invention contemplates that the facility 18 may be a medical facility, such as, for example, a doctor's office, a hospital, a pharmacy, a therapy center, a medical laboratory, a medical clinic, a rehabilitation facility, a dialysis unit, an out-patient center, an assisted-living care facility, an emergency room, or a nursing home. Those skilled in the art will appreciate, however, that the system 11 according to the present invention may be used at any facility, and that the list provided above is exemplary in nature, and not meant to be limiting.

The information collection center 19 may be associated with processing consumer information. Those skilled in the art will appreciate, however, that the information collection center 19 may be any location outside the facility 17 where consumer information may be gathered. A center associated with processing consumer information is preferable as that is likely the area where a fraud may be conducted, i.e., between the facility 17 and an information collection center 19 associated with processing consumer information.

Alternatively, the information collection center 19 may be associated with processing health insurance claims. Those skilled in the art will appreciate, however, that the information collection center 19 may be any location outside the facility 17 where consumer, or in this case, patient information may be gathered. A center associated with processing health insurance claims is preferable as that is likely the area where a medical fraud may be conducted, i.e., between the medical facility 17 and a information collection center 19 associated with processing health insurance claims, or some other sort of tampering with an insurance claim, Medicare/Medicaid claim, etc.

The signal transmitted from the first controller 12 to the second controller 14 may include information relating to a purchase of goods or services being provided to the consumer at the facility 17. More specifically, the signal transmitted from the first controller 12 to the second controller 14 may include a request for goods or services being provided to the consumer at the facility 17 so that more immediate or more rapid payment of the goods or services being provided to the consumer are provided to the facility associate. This advantageously enhances efficiency of the provision of consumer goods and services and payments for the same, as well as enhances collection efforts of facility operators. The second controller 14 may transmit a signal to the first controller including an indication of whether or not the purchase is acceptable based upon a substantially similarity between the individual asserting the consumer information and the photograph associated with the consumer information.

Alternatively, the signal transmitted from the first controller 12 to the second controller 14 may include information relating to a claim for reimbursement of medical services being provided to a consumer patient at the facility 17, wherein the facility 17 is a medical facility. More specifically, the signal transmitted from the first controller 12 to the second controller 14 may include a request for reimbursement of the medical treatment, or other medical services being provided to the patient at the facility 17 so that more immediate or more rapid payment of the medical services being provided to the patient are provided to the medical professional. This advantageously enhances efficiency of the provision of medical services and payments for the same, as well as enhances collection efforts of medical professionals when dealing with health insurance companies, for example. The second controller 14 may transmit a signal to the first controller including an indication of whether or not the claim is a valid claim based upon a substantially similarity between the patient asserting the consumer information and the photograph associated with the consumer information.

As also illustrated in FIG. 1A, the system 11 according to the present invention also includes a backup verifying system that may be activated to perform an action based on the occurrence of a backup event. The backup event that activates the backup verifying system may, for example, be an indication received from either of the first controller 12 or the second controller 14 that the individual asserting the consumer information's identity could not be verified by comparison with the official photograph 32 or the official biometric scan. Several other types of events may be considered as the backup event that triggers activation of the backup verifying system such as, for example, a malfunction in sending the first signal from the first controller 12 to the second controller 14, or a malfunction in the comparison between the individual asserting the consumer information and the official photograph 32 or the official biometric scan.

The action may, for example, be calling the cell phone, i.e., mobile telephone, of the consumer and speaking with the consumer to verify the identity of the individual asserting the consumer information as the consumer. The action may, alternately, be calling the facility 17 and requiring the consumer to verify their identity using a consumer identifier. Such calls may, for example, be automated calls that require entry of a code using the keypad of the telephone. The action may further be providing a notification to the facility 17 including a request that the consumer contact the information collection center 19 to verify the consumer's identity as illustrated, for example. In other words, the facility 17 may be called, or otherwise contacted, and provided with a request to ask the consumer to call the information collection center 19. This can allow the consumer to use any telephone in order to contact the information collection center 19 to thereby verify the individual's identity as one and the same as the consumer. The present invention contemplates that the facility 17 may be contacted in any number of ways to provide the request for the patient to contact the information collection center 19. For example, an electronic message may be transmitted to the facility 17 via electronic mail or via another type of electronic communication medium, as understood by those skilled in the art. Similarly, it is contemplated that the consumer may contact the information collection center 19 in any manner, i.e., calling the patient information collection center or even transmitting a response electronic message to the information collection center 19, as understood by those skilled in the art.

The action may also be calling the facility 17 and speaking with the consumer. This action may require the consumer to verify their identity using a consumer identifier that may be spoken by the consumer. For example, a customer service representative may initiate a phone call to the facility 17 upon activation of the backup verification system, and speak to the consumer and require the consumer to provide a consumer identifier to verbally verify the individual's identity as one and the same as the consumer. The consumer identifier may, for example, be the consumer's date of birth, a pin code selected by the consumer, a pin code that is preselected for the consumer, or some other identifying information relating to the consumer to verify that the individual is one and the same as the consumer, and that would routinely only be known by the consumer.

A person skilled in the art will recognize that, in the many embodiments of the invention depicted in FIGS. 2-10 and described hereinbelow, that in addition to the retrieval of an official photograph 32 from a photograph database, each of the embodiments may be adapted to retrieve an official biometric scan from a biometric scan database. Accordingly, the substitution or addition of use of a biometric sensor and retrieval of an official biometric scan are within the scope of all embodiments of the invention described herein above and below.

Figure 2:
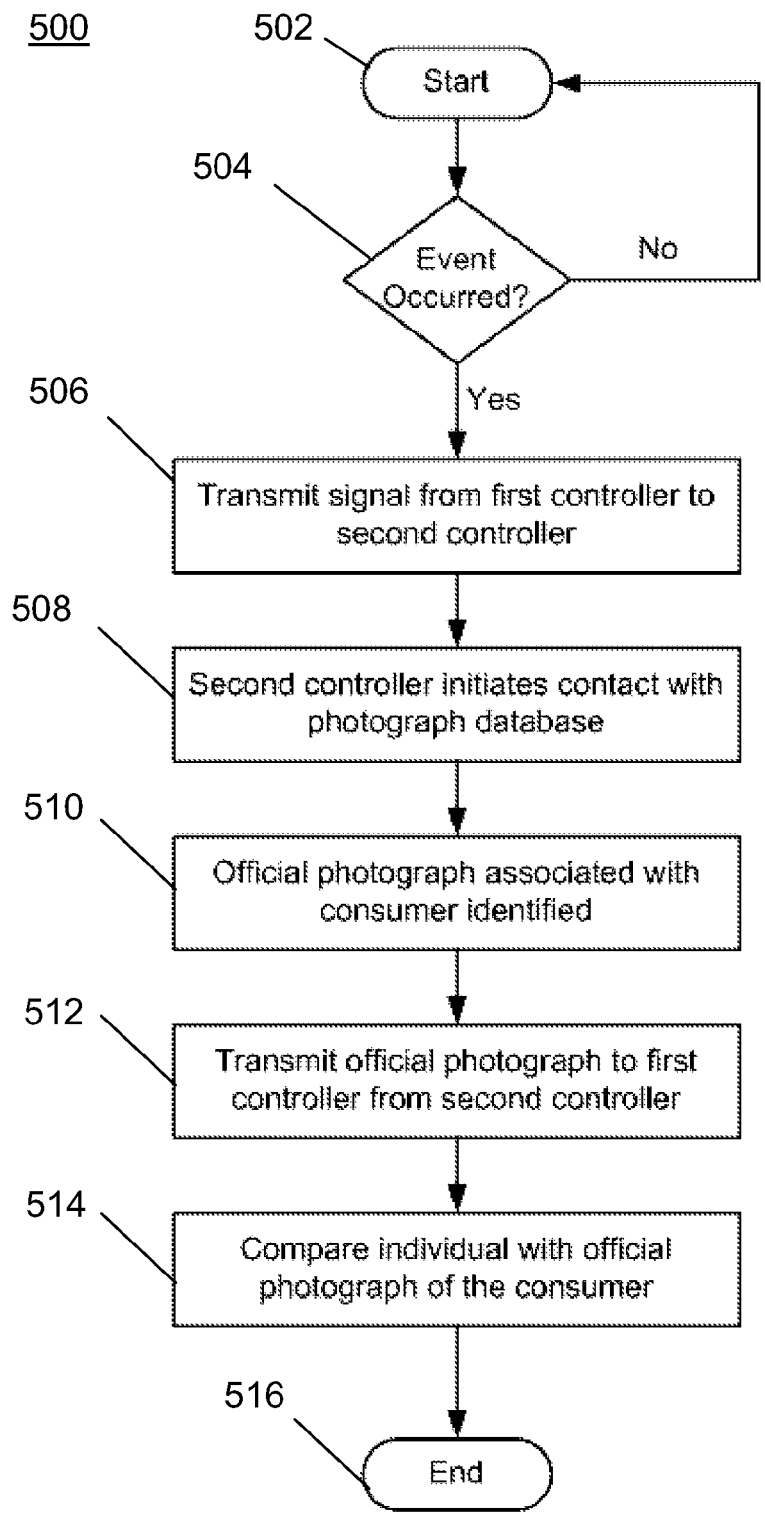
FIGS. 2-4 are flowcharts illustrating methods of preventing a fraud according to an embodiment of the invention.

Referring now additionally to the flowchart 500 illustrated in FIG. 2, a method aspect of the present invention is now described in greater detail. The method according to the present invention, and as illustrated in the flowchart 500 of FIG. 2, is directed to preventing fraud by determining whether the individual asserting consumer information looks substantially similar to an individual depicted in a photograph associated with the consumer information. From the start (Block 502), it is determined at Block 504 whether the event has occurred. If it is determined at Block 504 that the event has not occurred, then the system reverts back to the start Block 502 to await occurrence of the event. If it is determined at Block 504, however, that the event has occurred, a first signal may be transmitted from the first controller to the second controller at Block 506.

At Block 508, the second controller may initiate contact with the photograph database. Depending on the particular embodiment of the invention, this may be accomplished across a network by a network interface device included with the second controller. In another embodiment, the second controller may be able to contact the photograph database without the use of a network interface device.

At Block 510, once the second controller has initiated contact with the photograph database, an official photo may be associated with the consumer identified by the consumer information provided. The second controller may then transmit the official photograph to the first controller at Block 512. At Block 514, the official photograph may then be compared with an individual to determine whether the individual is sufficiently similar to the consumer depicted in the official photograph. The method is ended at Block 516. Accordingly, the method illustrated in the flowchart 500 in FIG. 2 provides an indication of whether or not the consumer is the individual that initiated the event to advantageously minimize fraud that may occur by identifying those instances when a transaction is being made by an individual not resembling the consumer depicted in the official photograph.

Figure 3:
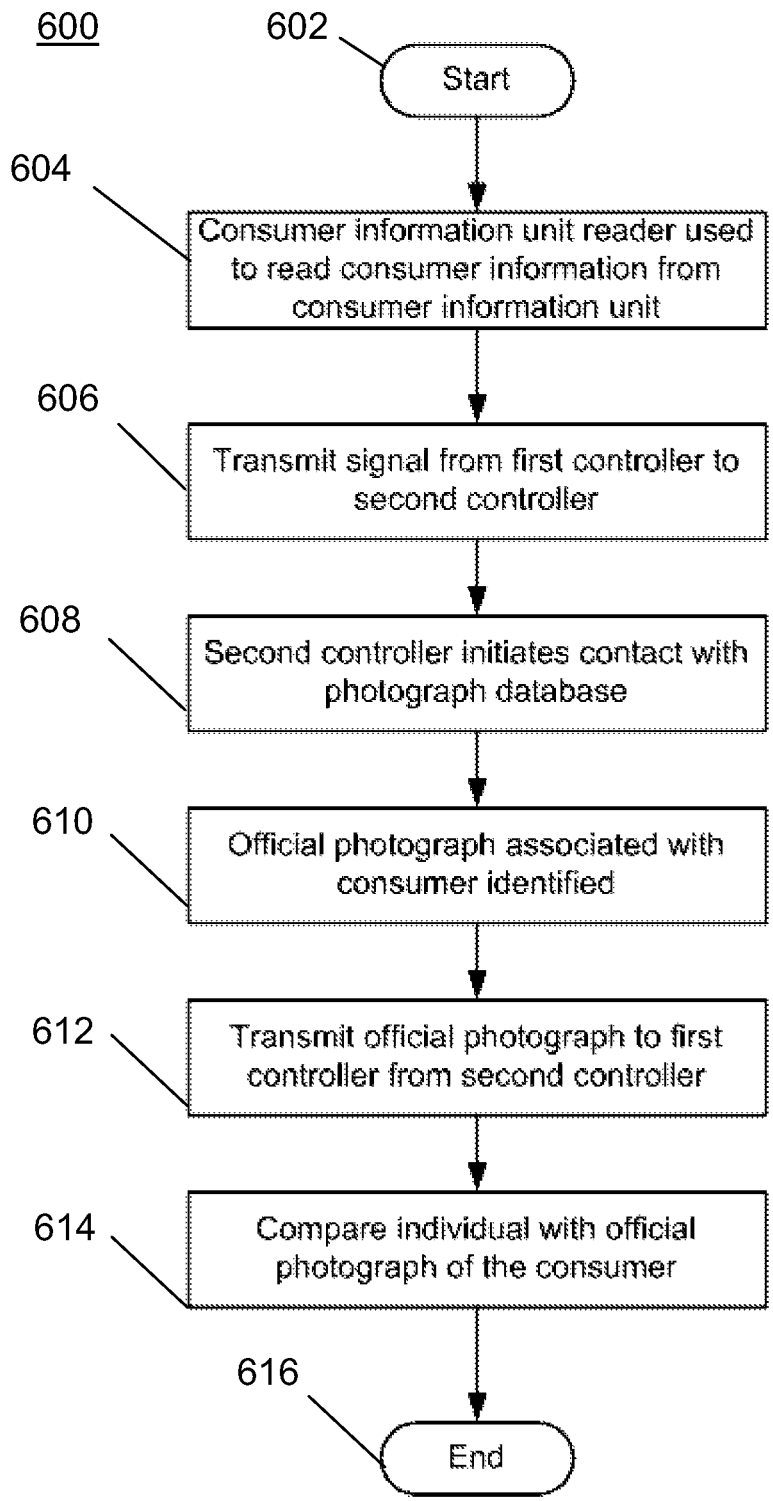

Referring now additionally to flow chart 600 illustrated in FIG. 3, a method aspect of the present invention is now described in greater detail. In the present method, the event triggering the transmission of the signal by the first controller may be the reading of a consumer information unit. The method starts at Block 602. At Block 604, a consumer information unit reader may be used to read consumer information from a consumer information unit. This may be accomplished by any of the combinations of consumer information units and consumer information unit readers presented hereinabove. At Block 606, the first controller may transmit a signal to the second controller. The signal may request an official photograph for the consumer associated with the consumer information read from the consumer information unit. At Block 608, the second controller may contact a photograph database containing official photographs, as described hereinabove. At Block 610, an official photograph associated with the consumer associated with the consumer information may be identified. The identified official photograph may be transmitted by the second controller to the first controller at Block 612. At Block 614 the official photograph may then be compared with the individual asserting the consumer information. The method may end at Block 616.

Figure 4:
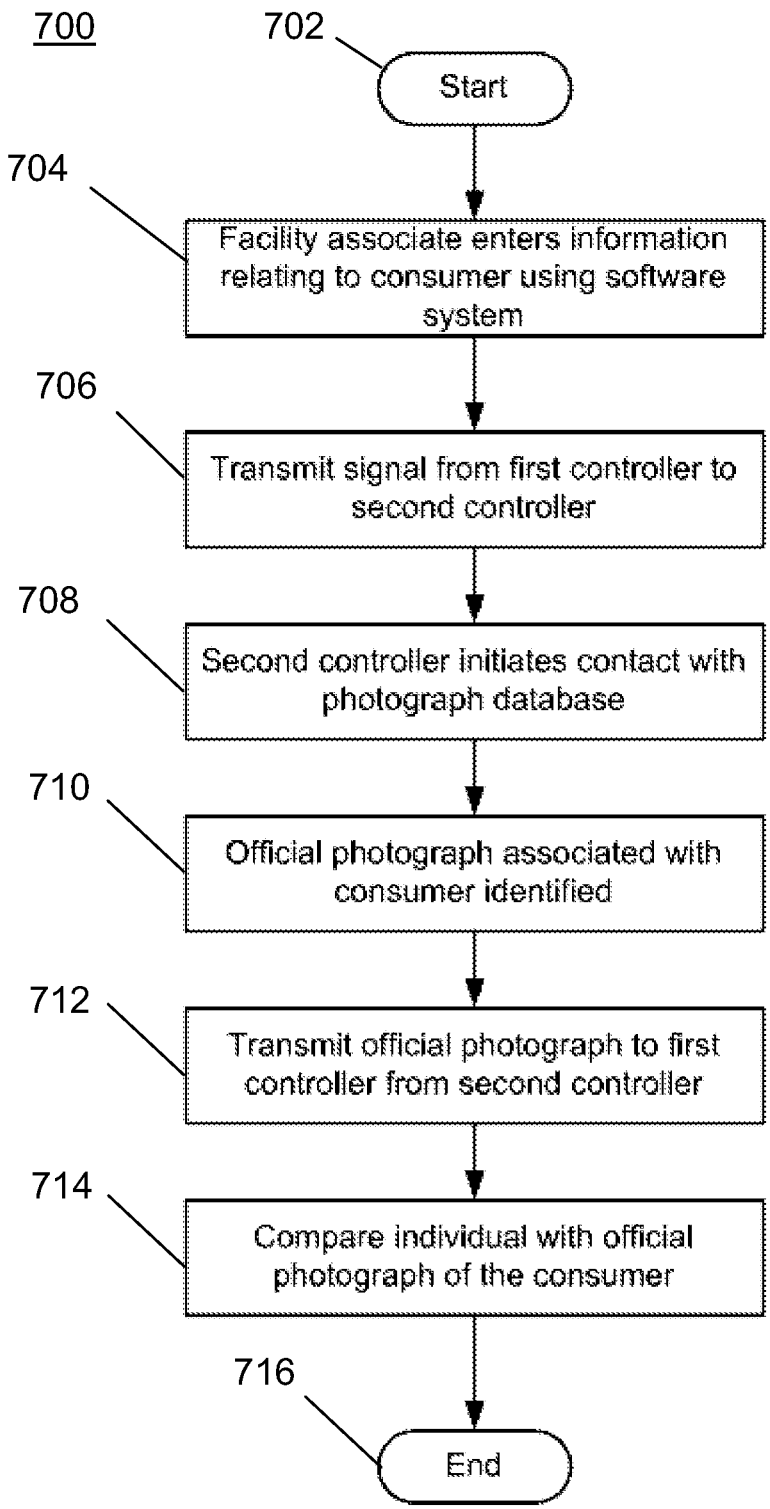

Referring now additionally to flow chart 700 illustrated in FIG. 4, a method aspect of the present invention is now described in greater detail. In the present method, the event triggering the transmission of the signal by the first controller may be the entering of consumer information using a software system. The method starts at Block 702. At Block 704, a facility associate may enter information relating to a consumer using a software system as described hereinabove. At Block 706, the first controller may transmit a signal to the second controller. The signal may request an official photograph for the consumer associated with the consumer information. At Block 708, the second controller may contact a photograph database containing official photographs, as described hereinabove. At Block 710, an official photograph associated with the consumer associated with the consumer information may be identified. The identified official photograph may be transmitted by the second controller to the first controller at Block 712. At Block 714 the official photograph may then be compared with the individual asserting the consumer information by the facility associate. The method may end at Block 716.

Figure 5:
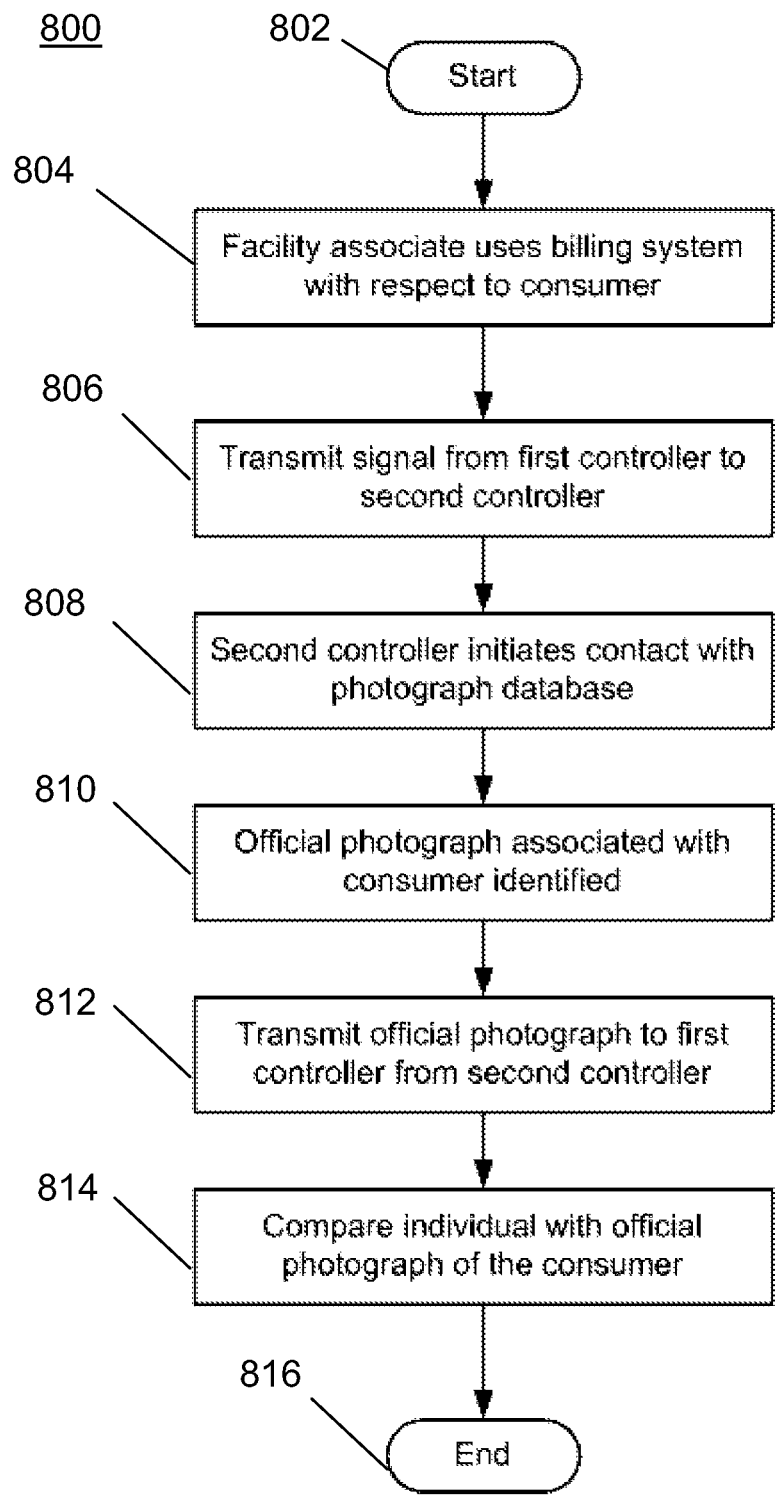
FIG. 5 is a flowchart illustrating a method of preventing a fraud according to an alternative embodiment of the invention.

Referring now additionally to flow chart 800 illustrated in FIG. 5, a method aspect of the present invention is now described in greater detail. In the present method, the event triggering the transmission of the signal by the first controller may be the usage of a billing system with respect to the consumer. The method starts at Block 802. At Block 804, a facility associate may use a billing system that identifies a consumer associated with consumer information. At Block 806, the first controller may transmit a signal to the second controller. The signal may request an official photograph for the consumer associated with the consumer information. At Block 808, the second controller may contact a photograph database containing official photographs, as described hereinabove. At Block 810, an official photograph associated with the consumer associated with the consumer information may be identified. The identified official photograph may be transmitted by the second controller to the first controller at Block 812. At Block 814 the official photograph may then be compared with the individual asserting the consumer information by the facility associate. The method may end at Block 816.

Figure 6:
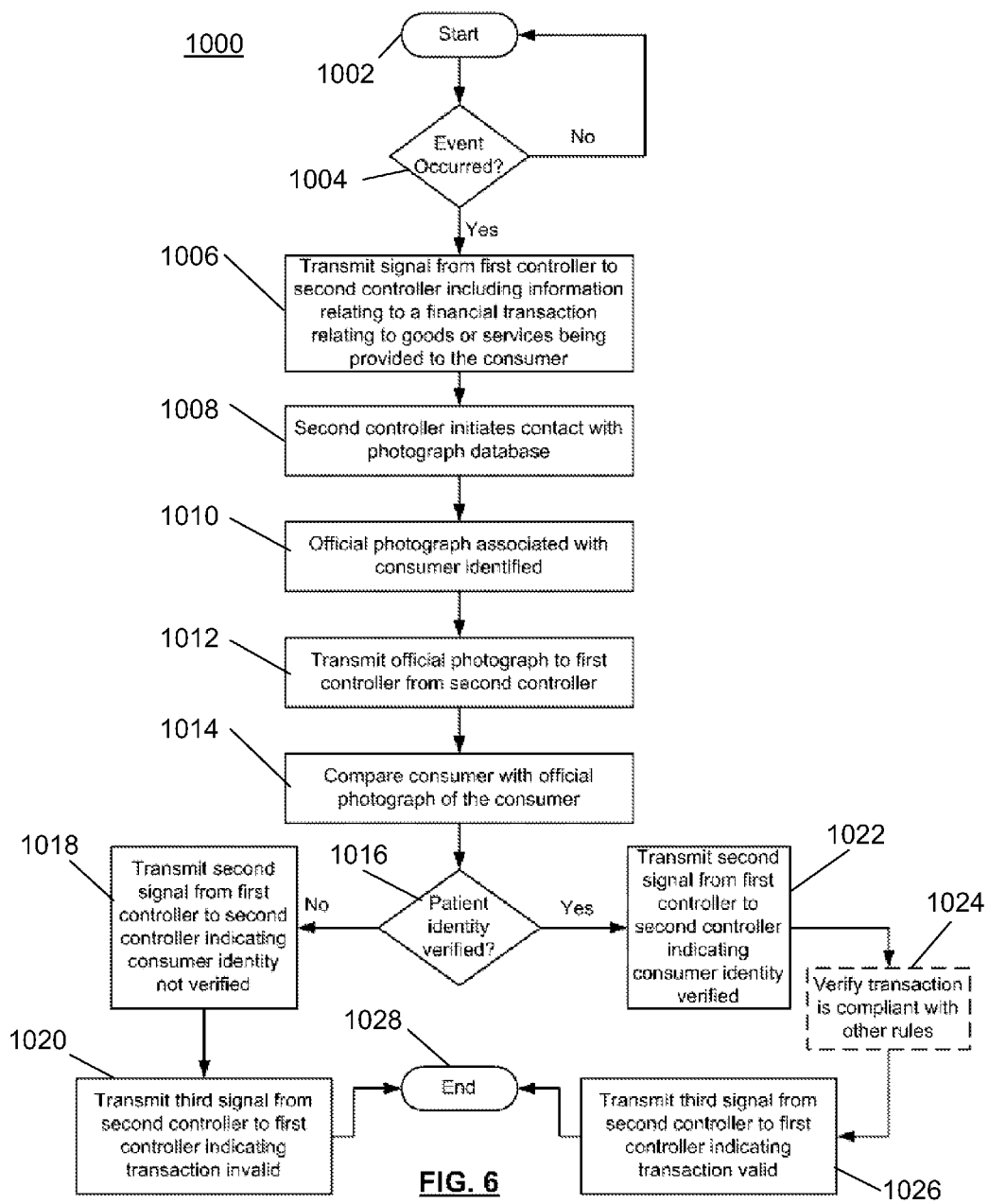
FIG. 6 is a flowchart illustrating a method of preventing a fraud according to an alternative embodiment of the invention.

Referring now additionally to flow chart 1000 illustrated in FIG. 6, a method aspect of the present invention is now described in greater detail. In the present method, may indicate whether or not a financial transaction relating to the delivery of goods or services is valid. From the start (Block 1002), it is determined at Block 1004 whether the event has occurred. If it is determined at Block 1004 that the event has not occurred, then the system reverts back to the start Block 1002 to await occurrence of the event. If it is determined at Block 1004, however, that the event has occurred, a first signal may be transmitted from the first controller to the second controller at Block 1006. More specifically, the first controller may transmit a signal to the second controller that may include information relating to a financial transaction relating to goods or services being provided to the consumer. At Block 1008, the second controller may contact a photograph database containing official photographs, as described hereinabove. At Block 1010, an official photograph associated with the consumer associated with the financial transaction information may be identified. The identified official photograph may be transmitted by the second controller to the first controller at Block 1012. At Block 1014 the official photograph may then be compared with the consumer.

At Block 1016, the identity of the individual asserting the financial transaction may or may not be verified as the consumer. If the identity is not verified, then at Block 1018, the first controller may transmit a second signal to the second controller indicating the consumer identity was not verified. Then, at Block 1020, the second controller may transmit a third signal to the first controller indicating that the financial transaction is invalid.

If, at Block 1016, the consumer identity is verified, then the first controller may transmit a second signal to the second controller indicate that the patient identity was verified at Block 1022. Then, at Block 1024, the second controller may verify that the financial transaction related to goods or services provided to the consumer may be verified with other rules related to the transaction. The other rules may be rules provided by the consumer, the facility providing the goods or services, or a financial institution to which the transaction is being submitted. Once the transaction has been verified as compliant with the other rules, the second controller may transmit a third signal to the first controller indicated that the transaction is valid at Block 1026. The method may end at Block 1028.

Figure 7:
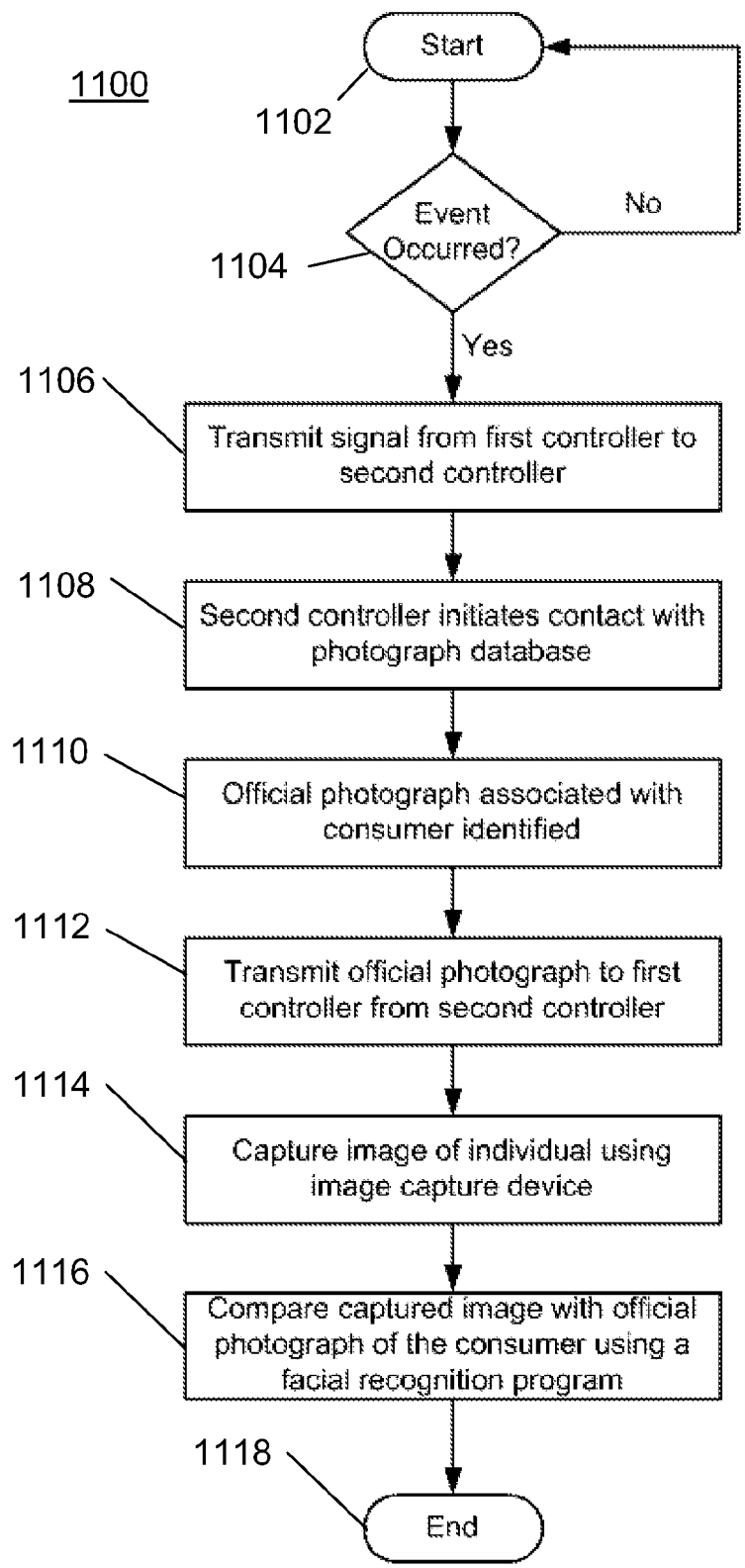
FIG. 7 is a flowchart illustrating a method of preventing a fraud according to an alternative embodiment of the invention.

Referring now to flow chart 1100 illustrated in FIG. 7, a method aspect of the present invention is now described in greater detail. In the present method, the system may be configured to compare the official photograph to a photograph captured by an image capture device. From the start (Block 1102), it is determined at Block 1104 whether the event has occurred. If it is determined at Block 1104 that the event has not occurred, then the system reverts back to the start Block 1102 to await occurrence of the event. If it is determined at Block 1104, however, that the event has occurred, a first signal may be transmitted from the first controller to the second controller at Block 1106. At Block 1108, the second controller may contact a photograph database containing official photographs, as described hereinabove. At Block 1110, an official photograph associated with the consumer associated with the consumer information may be identified. The identified official photograph may be transmitted by the second controller to the first controller at Block 1112. At Block 1114, an image capture device included with the first controller may capture an image of the individual asserting the consumer information. Then, at Block 1116, the system may compare the captured image with the official photograph using a facial recognition program. The facial recognition program may be located at either the first controller or the second controller. The method may end at Block 1118.

Figure 8:
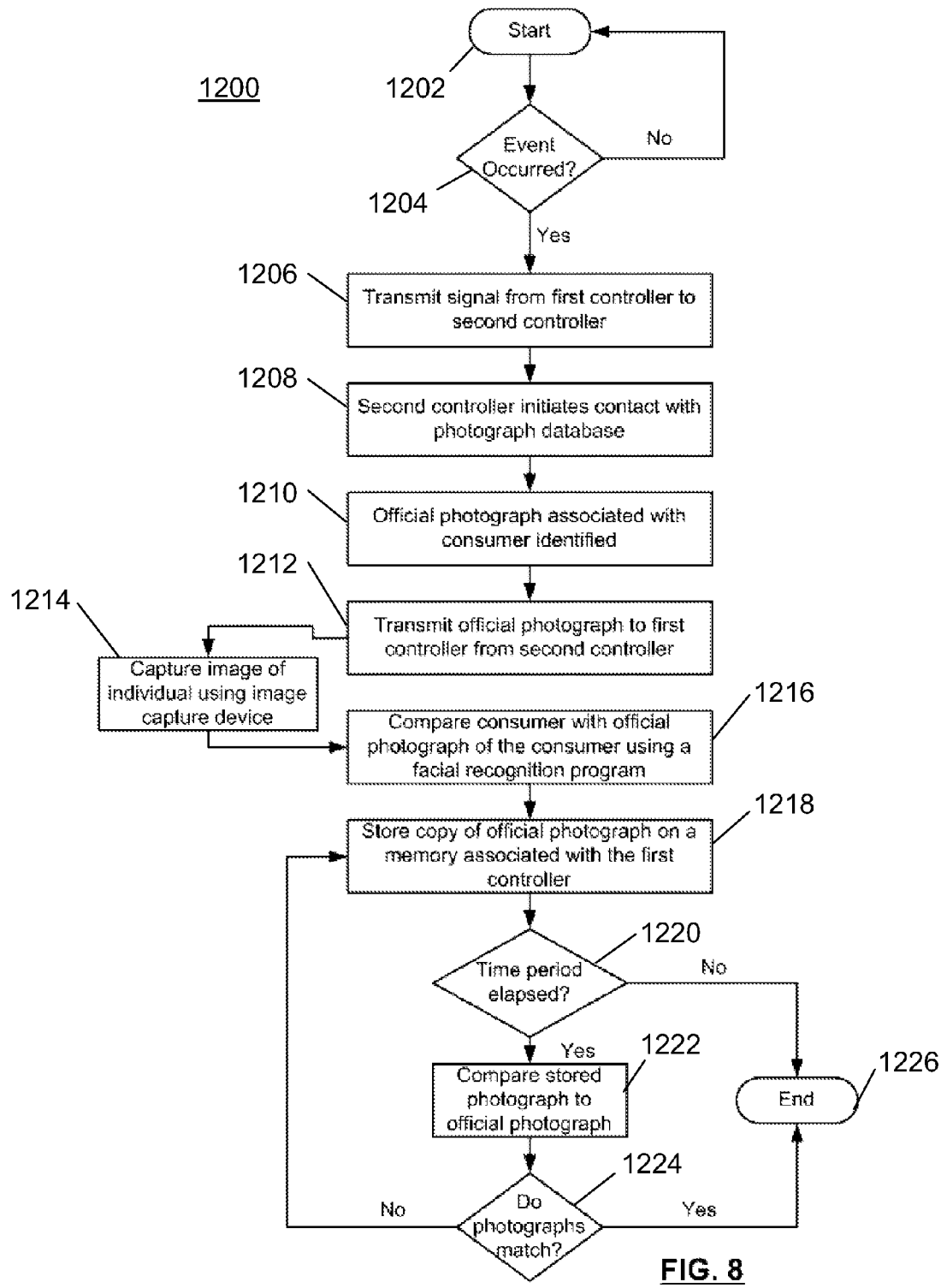
FIG. 8 is a flowchart illustrating a method of preventing a fraud according to an alternative embodiment of the invention.

Referring now additionally to flow chart 1200 illustrated in FIG. 8, a method aspect of the present invention is now described in greater detail. In the present method, the system may be configured to store the official photograph. From the start (Block 1202), it is determined at Block 1204 whether the event has occurred. If it is determined at Block 1204 that the event has not occurred, then the system reverts back to the start Block 1202 to await occurrence of the event. If it is determined at Block 1204, however, that the event has occurred, a first signal may be transmitted from the first controller to the second controller at Block 1206. At Block 1208, the second controller may contact a photograph database containing official photographs, as described hereinabove. At Block 1210, an official photograph associated with the consumer associated with the consumer information may be identified. The identified official photograph may be transmitted by the second controller to the first controller at Block 1212. At Block 1214, an image capture device included with the first controller may capture an image of the individual asserting the consumer information. Then, at Block 1216, the system may compare the captured image with the official photograph using a facial recognition program. The facial recognition program may be located at either the first controller or the second controller. At Block 1218, a copy of the official photograph may be stored in a memory associated with the first controller as described hereinabove.

The method may continue at Block 1220, which inquires whether a time period has elapsed. The length of the time period may be selected to be any length of time, particularly a length of time that, once elapsed, the patient's official photograph may no longer be an accurate depiction of the patient. If the time period has not elapsed, the method may end at Block 1226. If the time period has elapsed, then the first controller may compare the stored official photograph to a current official photograph retrieved from the photograph database after the time period has elapsed, at Block 1222. The photographs may be compared by any method described hereinabove, including through use of facial recognition software, use of an algorithm, or by the visual comparison by a facility associate. At Block 1224, if the photographs do match, the method may end at Block 1226. If the photographs do not match, then the system may revert to Block 1218 and store the current official photograph retrieved from the photograph database. The storage of the current official photograph may either cause the deletion of the previous stored official photograph, or the previous stored official photograph may be retained, as described hereinabove.

Figure 9:
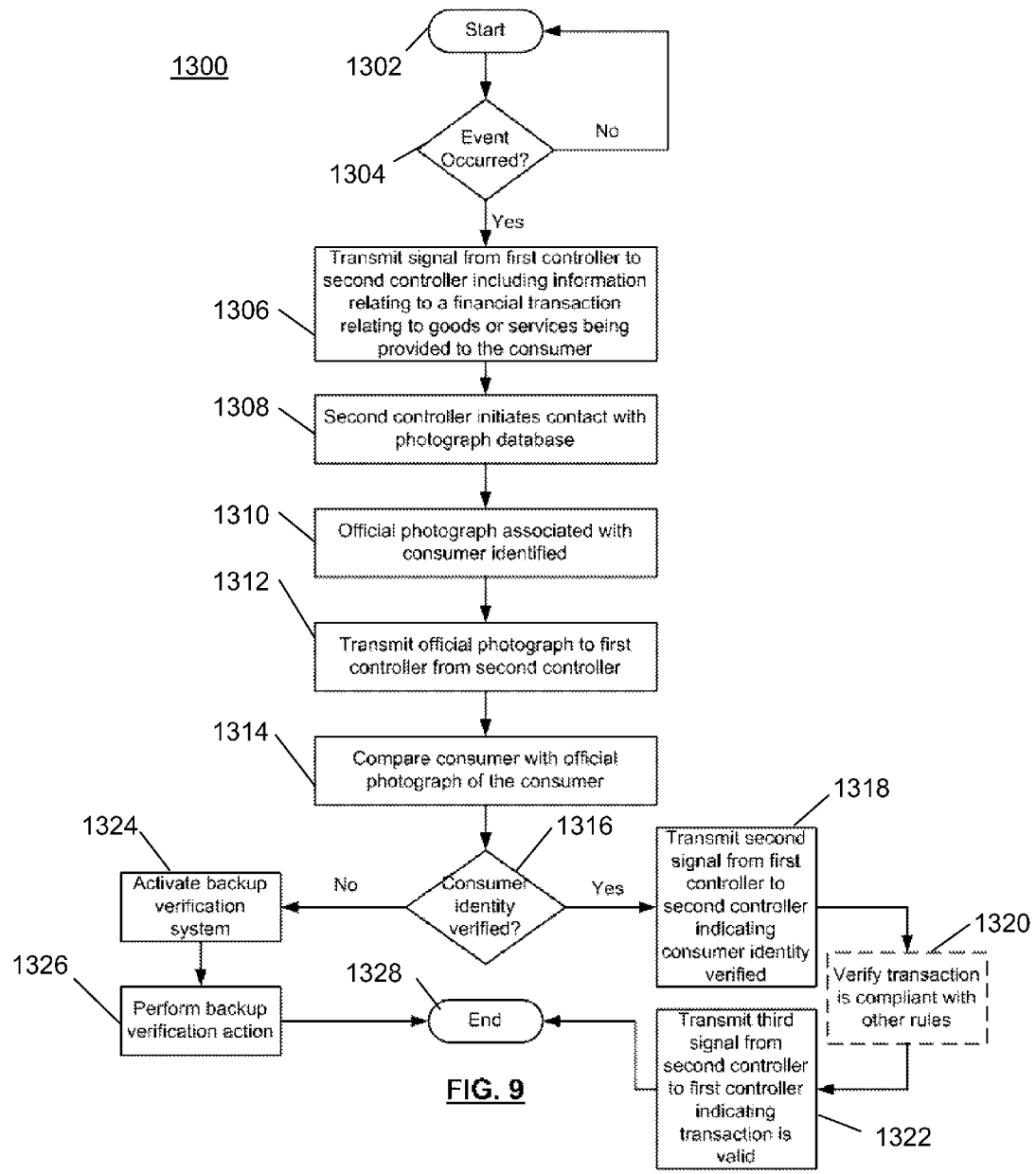
FIG. 9 is a flowchart illustrating a method of preventing a fraud according to an alternative embodiment of the invention.

Referring now additionally to flow chart 1300 illustrated in FIG. 9, a method aspect of the present invention is now described in greater detail. In the present method, the system may be configured to include a backup verification system that may be activated in the event that the consumer identity cannot be verified. From the start (Block 1302), it is determined at Block 1304 whether the event has occurred. If it is determined at Block 1304 that the event has not occurred, then the system reverts back to the start Block 1302 to await occurrence of the event. If it is determined at Block 1304, however, that the event has occurred, a first signal may be transmitted from the first controller to the second controller at Block 1306. More specifically, the first controller may transmit a signal to the second controller that may include information relating to a claim financial transaction relating to goods or services being provided to the consumer. At Block 1308, the second controller may contact a photograph database containing official photographs, as described hereinabove. At Block 1310, an official photograph associated with the consumer associated with the financial transaction information may be identified. The identified official photograph may be transmitted by the second controller to the first controller at Block 1312. At Block 1314 the official photograph may then be compared with the consumer.

At Block 1316, the identity of the individual asserting the transaction information may or may not be verified as the consumer. If the consumer identity is verified, then the first controller may transmit a second signal to the second controller indicate that the consumer identity was verified at Block 1318. Then, at Block 1320, the second controller may verify that the financial transaction related to goods or services provided to the consumer may be verified with other rules related to the transaction. The other rules may be rules provided by the consumer, the facility providing the goods or services, or a financial institution to which the transaction is being submitted. Once the transaction has been verified as compliant with the other rules, the second controller may transmit a third signal to the first controller indicated that the transaction is valid at Block 1322. The method may end at Block 1328.

If, at Block 1316, the identity is not verified, then at Block 1324 the system may activate a backup verification system as described hereinabove. Upon the activation of the backup verification system, the system may perform any of the actions described hereinabove to carry out the backup verification, including, for example, calling the consumer or contacting the facility. The method may then end at Block 1328.

Figure 10:
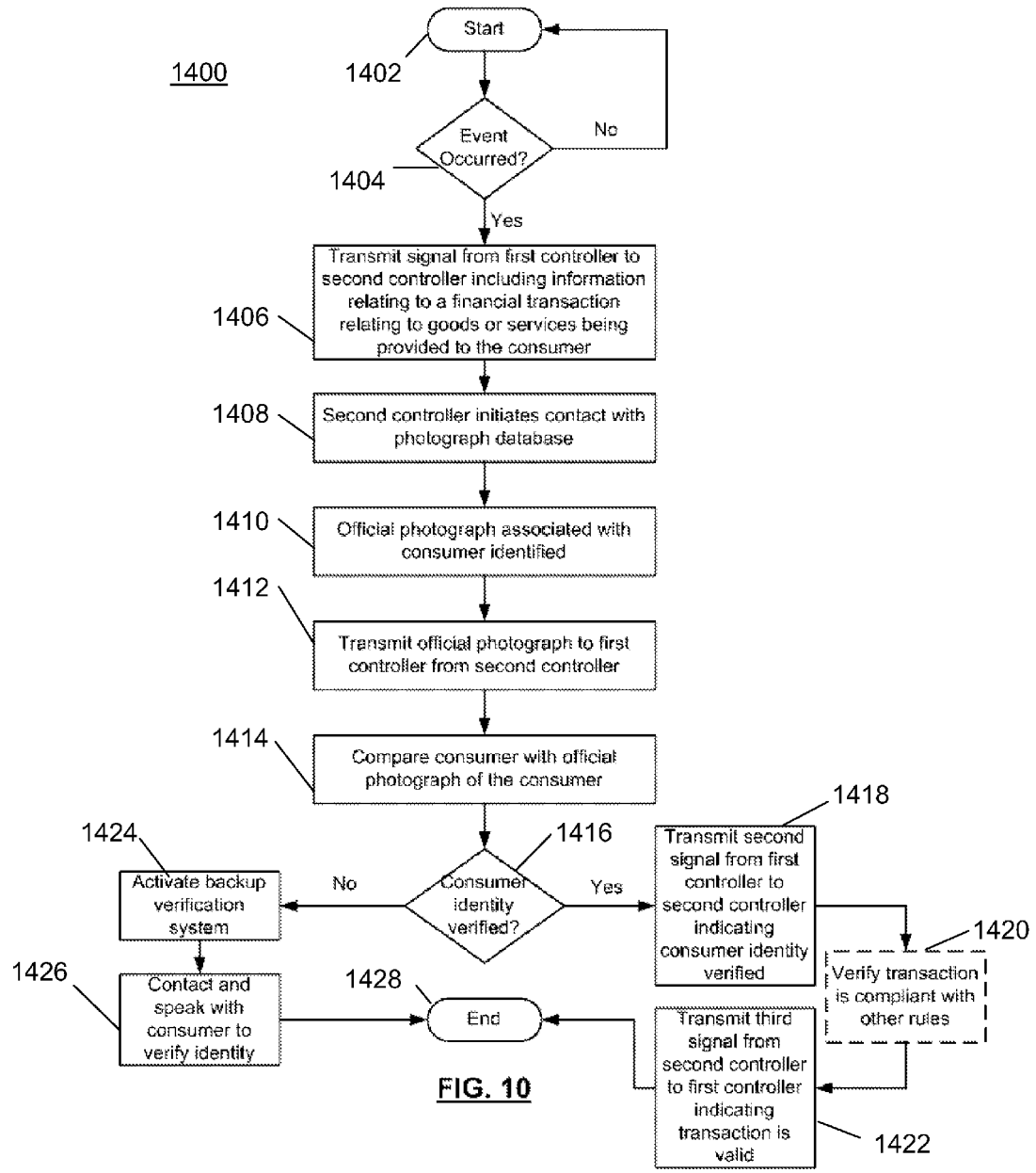
FIG. 10 is a flowchart illustrating a method of preventing a fraud according to an alternative embodiment of the invention.

Referring now additionally to flow chart 1400 illustrated in FIG. 10, a method aspect of the present invention is now described in greater detail. In the present method, the system may be configured to include a backup verification system that may be activated in the event that the consumer identity cannot be verified. More specifically, the backup system may include contacting and speaking with the consumer to verify their identity. From the start (Block 1402), it is determined at Block 1404 whether the event has occurred. If it is determined at Block 1404 that the event has not occurred, then the system reverts back to the start Block 1402 to await occurrence of the event. If it is determined at Block 1404, however, that the event has occurred, a first signal may be transmitted from the first controller to the second controller at Block 1406. More specifically, the first controller may transmit a signal to the second controller that may include information relating to a financial transaction relating to goods or services being provided to the consumer. At Block 1408, the second controller may contact a photograph database containing official photographs, as described hereinabove. At Block 1410, an official photograph associated with the consumer associated with the financial transaction information may be identified. The identified official photograph may be transmitted by the second controller to the first controller at Block 1412. At Block 1414 the official photograph may then be compared with the consumer.

At Block 1416, the identity of the individual asserting the financial transaction may or may not be verified as the consumer. If the consumer identity is verified, then the first controller may transmit a second signal to the second controller indicating that the consumer identity was verified at Block 1418. Then, at Block 1420, the second controller may verify that the financial transaction related to goods or services provided to the consumer may be verified with other rules related to the transaction. The other rules may be rules provided by the consumer, the facility providing the goods or services, or a financial institution to which the transaction is being submitted. Once the transaction has been verified as compliant with the other rules, the second controller may transmit a third signal to the first controller indicated that the transaction is valid at Block 1422. The method may end at Block 1428.

If, at Block 1416, the identity is not verified, then, at Block 1424, the system may activate a backup verification system as described hereinabove. Upon the activation of the backup verification system, the system may contact and speak with the consumer to verify the consumer's identity. This may be accomplished by calling a cellular telephone of the consumer, or by contacting the facility by telephonic or electronic messaging methods. The system may then request that a personal identification number or other identifying information be conveyed to the system via the communication method employed by the system. The method may then end at Block 1328.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for verifying the identity of a consumer comprising:
   a first controller associated with a facility;
   a memory associated with the first controller;
   a biometric sensor in communication with the first controller;
   a second controller associated with an information collection center and adapted to be in communication with the first controller;
   a network interface; and
   a biometric scan database;
   wherein the biometric scan database includes biometric scans that are verifiable as being associated with a consumer, the biometric scans being defined as official biometric scans,
   wherein the biometric scan database is accessible via the network interface,
   wherein the first controller is configured to transmit a first signal that includes a request for an official biometric scan associated with a consumer to the second controller responsive to an occurrence of an event, wherein the second controller is configured to initiate contact with the biometric scan database via the network interface in response to the first signal received from the first controller, wherein an official biometric scan associated with the consumer is identified within the biometric scan database, wherein the second controller is configured to transmit the official biometric scan associated with the consumer to the first controller in response to the first signal received from the first controller, wherein a copy of the official biometric scan is stored on a memory associated with the first controller to define a stored official biometric scan;

wherein the stored official biometric scan is verified for accuracy by comparing the stored official biometric scan to an updated official biometric scan after a period of time during which the biometric feature included in the stored official biometric scan may have changed;

wherein the biometric sensor is configured to scan a biometric feature of the consumer producing a biometric scan of the consumer, and wherein a consumer identity is verified by performing a comparison of the biometric scan of the consumer with the official biometric scan associated with the consumer.

2. A system according to claim 1 wherein the consumer is assigned a consumer information unit having consumer information associated therewith; and wherein the event is reading the consumer information from the consumer information unit, and wherein a consumer information unit reader is configured to read the consumer information from the consumer information unit and be in communication with the first controller.

3. A system according to claim 2 wherein the consumer information unit reader is integrally formed with the first controller.

4. A system according to claim 2 wherein the consumer information unit is a credit card or a debit card.

5. A system according to claim 1 wherein a software system in communication with the first controller is operable by an operator at a facility wherein the first controller is located, wherein the operator is prompted to enter information relating to the consumer using the software system, and wherein the event is entry of the information relating to the consumer using the software system.

6. A system according to claim 1 further comprising a billing system associated with the first controller; wherein the event is entry of information associated with the consumer in the billing system.

7. A system according to claim 1 wherein the first signal includes information relating to a transaction relating to goods or services being provided to the consumer at the facility.

8. A system according to claim 1, wherein the first controller transmits an indication to the second controller indicating whether the identity of the consumer is verified.

9. A system according to claim 8 wherein the second controller transmits a validation signal to the first controller in response to the indication signal including an indication of whether or not the transaction is a valid transaction based on the indication of whether the consumer identity is verified.

10. A system according to claim 1 wherein the official biometric scan is a photograph retrieved from at least one of department of motor vehicles, a licensing agency, a passport agency, and a law enforcement agency.

11. A system according to claim 1 wherein the official biometric scan is at least one of a finger print, a thumb print, an iris scan, and a retina scan; and wherein the biometric sensor is configured to scan at least one biometric feature of the consumer selected from the group of biometric features consisting of finger prints, thumb prints, iris scans, and retina scans.

12. A system according to claim 1 wherein the first controller comprises a user interface associated therewith, the user interface including a display; wherein a biometric feature recognition program performs a comparison between the biometric scan of the consumer and the official biometric scan associated with the consumer; wherein the comparison by the biometric feature recognition program is performed by at least one of the first controller, second controller, and a remote computerized device; and wherein results of the comparison are displayed via the user interface.

13. A system according to claim 12, wherein the comparison by the biometric feature recognition program is performed by at least two of the first controller, second controller, and remote computerized device; and wherein the results of the at least two biometric feature recognition program performances are compared for consistency.

14. A system according to claim 12 wherein the results include an indication of similarity between the biometric scan of the consumer and the official biometric scan associated with the consumer.

15. A system according to claim 14 wherein the biometric feature recognition program indicates verification of the consumer's identity when the indication of similarity is equal to or above a threshold value; wherein if the indication of similarity is equal to or above the threshold value the transaction is determined to be valid; and wherein if the indication of similarity is below the threshold value the transaction is determined to be invalid.

16. A system according to claim 1 wherein a copy of the official biometric scan is stored on a memory associated with the first controller to define a stored official biometric scan; and wherein after a period of time, the stored official biometric scan is replaced with an updated official biometric scan, wherein the first controller retrieves the updated official biometric scan, and wherein the updated official biometric scan is stored on the memory and defined as an updated stored official biometric scan.

17. A system according to claim 16 wherein the official biometric scan previously defined as the stored official biometric scan is retained within the memory.

18. A system according to claim 1 further comprising a backup verification system that is activated to perform an action based on a backup event; wherein the backup event that activates the backup verification system is an indication from the first controller that the consumer identity is not verified based on the comparison of a biometric feature of the consumer to the official biometric scan of the consumer; and wherein the action is at least one of calling the consumer's mobile telephone and speaking with the consumer to verify the consumer identity, providing a notification to the facility including a request that the consumer contact the information collection center to verify the consumer identity, and calling the facility and requiring the consumer to verify the consumer identity using a consumer identifier.

19. A method of using a consumer identity verification system that includes a first controller associated with a facility, a memory associated with the first controller, a biometric sensor capable of producing biometric scans of a consumer and being in communication with the first controller, a second controller associated with a information collection center and adapted to be in communication with the first controller, a network interface and a biometric scan database that is accessible via the network interface and includes biometric scans that are verifiable, the biometric scans being defined as official biometric scan, the method comprising:

sending a first signal from the first controller to the second controller responsive to an occurrence of an event;

initiating contact with the biometric scan database via the network interface in response to the first signal;

transmitting a request for an official biometric scan associated with a consumer name;

identifying the official biometric scan associated with the consumer name within the biometric scan database;

transmitting the official biometric scan associated with the consumer name to the first controller;

generating a scan of a biometric feature of the consumer by scanning a biometric feature of the consumer using the biometric sensor;

storing a copy of the official biometric scan is stored on the memory to define a stored official biometric scan;

verifying the accuracy of the stored official biometric scan by comparing the stored official photograph to an updated official biometric scan after a time period during which the biometric feature of the stored official biometric scan may have changed;

generating a biometric scan of a biometric feature of the consumer using the biometric sensor; and verifying a consumer identity by performing a comparison of the scan of a biometric feature of the consumer with the official biometric scan associated with the consumer.

20. A method according to claim 19 wherein the event is reading consumer information from a consumer information unit associated with the consumer, and wherein a consumer information unit reader is configured to read the consumer information from the consumer information unit and be in communication with the first controller.

21. A method according to claim 19 further comprising prompting a facility associate to enter information relating to the consumer using a software system software system in communication with the first controller; and wherein the event is entry of the information relating to the consumer using the software system.

22. A method according to claim 19 wherein the event is entry of information associated with the consumer in a billing system in communication with the first controller.

23. A method according to claim 19 wherein the first signal includes information relating to a transaction relating to goods or services being provided to the consumer at the facility.

24. A method according to claim 19 further comprising:
transmitting an indication from the first controller to the second controller indicating whether the identity of the consumer is verified; and
transmitting a second signal from the second controller to the first controller including an indication of whether or not the transaction is a valid transaction based on the indication of whether the consumer identity is verified.

25. A method according to claim 19 wherein the official biometric scan is at least one of a finger print, a thumb print, an iris scan, and a retina scan; and wherein the biometric sensor is configured to scan at least one biometric feature of the consumer selected from the group of biometric features consisting of finger prints, thumb prints, iris scans, and retina scans.

26. A method according to claim 19 wherein the first controller comprises a user interface associated therewith, the user interface including a display wherein a biometric feature recognition program performs a comparison between the biometric scan of the consumer and the official biometric scan associated with the consumer; wherein the comparison by the biometric feature recognition program is performed by at least one of the first controller, second controller, and a remote computerized device; and wherein results of the comparison are displayed via the user interface.

27. A method according to claim 26 wherein the comparison by the biometric feature recognition program is performed by at least two of the first controller, second controller, and remote computerized device; and wherein the results of the at least two biometric feature recognition program performances are compared for consistency.

28. A method according to claim 26 wherein the results include an indication of similarity between the biometric scan of the consumer and the official biometric scan associated with the consumer.

29. A method according to claim 28 further comprising activating a backup verification system to perform an action based on a backup event; wherein the backup event that activates the backup verification system is an indication from the first controller that the consumer identity is not verified based on the comparison of the consumer to the official biometric scan of the consumer; and wherein the action is at least one of calling the consumer's mobile telephone and speaking with the consumer to verify the consumer identity, providing a notification to the facility including a request that the consumer contact the information collection center to verify the consumer identity, and calling the facility and requiring the consumer to verify the consumer identity using a consumer identifier.

30. A method according to claim 28 wherein the biometric feature recognition program indicates verification of the consumer's identity when the indication of similarity is above a threshold value; wherein if the indication of similarity is equal to or above the threshold value the transaction is determined to be valid; and wherein if the indication of similarity is below the threshold value the transaction is determined to be invalid.

31. A method according to claim 19 wherein the stored official biometric scan is not verified for accuracy, further comprising the steps of:
retrieving the updated official biometric scan;
storing the updated official biometric scan on the memory;
defining the updated official biometric scan stored on the memory as an updated stored official biometric scan; and
retaining the official biometric scan previously defined as the stored official biometric scan within the memory.

* * * * *